April 11, 1944.                B. M. HYMAN ET AL                2,346,306
                                 CORN HARVESTER
                    Original Filed May 27, 1938       2 Sheets-Sheet 1

Inventors
B.M.Hyman
R.C.Ferguson
By Paul O. Pippel
Atty.

April 11, 1944.  B. M. HYMAN ET AL  2,346,306
CORN HARVESTER
Original Filed May 27, 1938  2 Sheets-Sheet 2

Inventor
B.M.Hyman
R.C.Fergason
By Paul O. Pippel
Atty.

Patented Apr. 11, 1944

2,346,306

UNITED STATES PATENT OFFICE 2,346,306

CORN HARVESTER

Benjamin M. Hyman, Moline, Ill., and Rector C. Fergason, La Porte, Ind., assignors to International Harvester Company, a corporation of New Jersey Original application May 27, 1938, Serial No. 210,464. Divided and this application August 28, 1941, Serial No. 408,646

11 Claims. (Cl. 56—119)

This application is a division of the application of Hyman et al., Serial No. 210,464, filed May 27, 1938, on which Patent No. 2,255,168 issued on September 9, 1941.

This invention relates to a corn picker construction. More specifically it relates to special means for adjusting the gathering chains and divider points with respect to the lower end of snapping rolls.

It frequently becomes desirable to adjust various elements which operate in conjunction with the lower end of snapping rolls of a corn picker so that there is a variation in the height at which the snapping rolls operate and, consequently, a change in their effectiveness. Furthermore, it may be desirable, because of soil conditions, to keep the lower end of the snapping rolls from operating too low.

An object of the present invention is to provide an improved harvester construction.

A further object is the provision of an improved gathering means for a harvester.

Another object is to provide means for varying the effectiveness of the lower ends of snapping rolls of a corn picker.

A still further object is to provide means for adjusting various gathering elements which operate in conjunction with the lower end of snapping rolls of a corn picker.

According to the present invention, means are provided for the adjustment with respect to the lower end of snapping rolls of the pivotal mounting of pivoted divider points and of pulleys and rollers within gather chains adjacent the lower end of the snapping rolls.

In the drawings—

Figure 1:
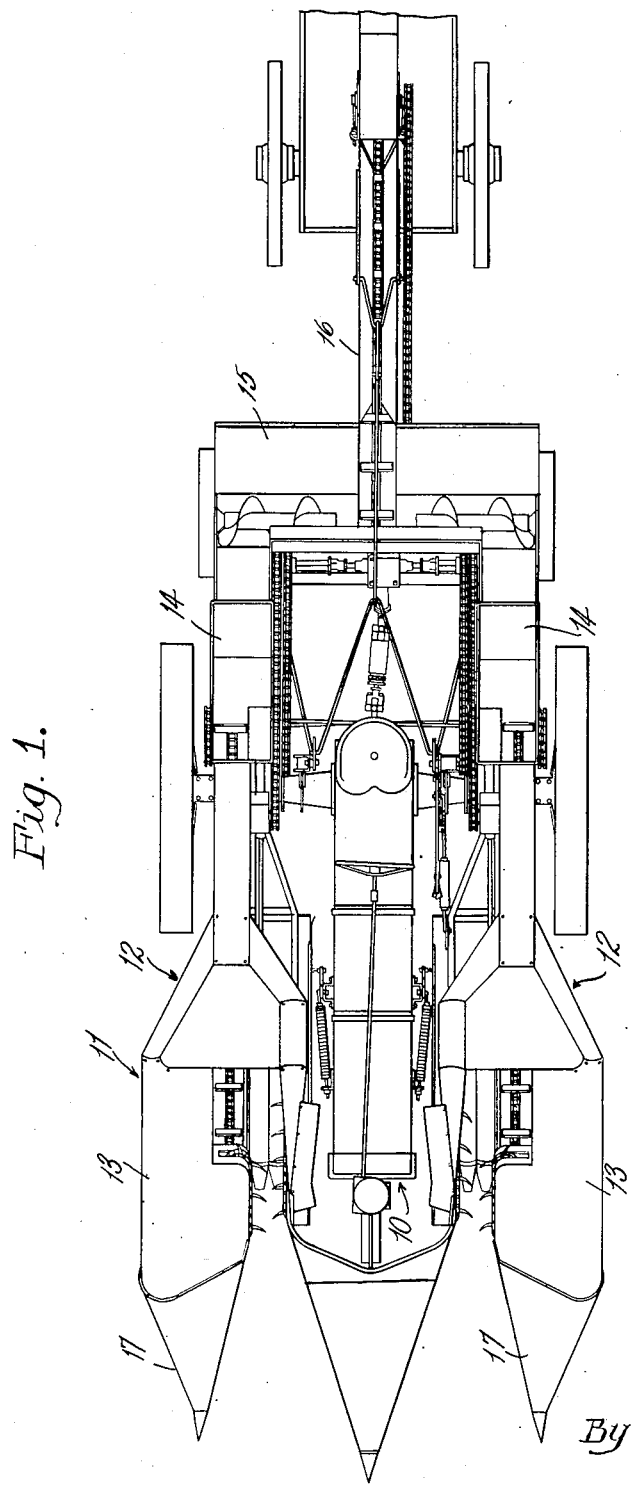
Figure 1 is a plan view of a tractor and a corn picker mounted thereon.

Figure 1 shows a corn picker mounted on a tractor in a manner more fully shown and claimed in the aforementioned Hyman et al. application. As seen in this figure, the reference character 10 designates a tractor of the well known tricycle type. Mounted upon the tractor is a corn picker 11 which includes units 12 at opposite sides of the tractor. Each unit includes a snapping or gathering unit 13 and a husking unit 14. Extending between the rear of the husking units 14 is an auger feed device 15. A wagon elevator 16 extends rearwardly from the auger feed device 15. Each snapping unit 13 has a gathering point 17.

Figure 2:
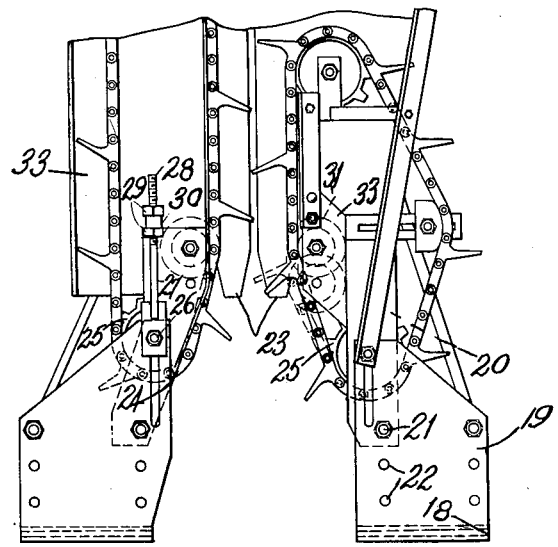
Figure 2 is a detail view showing provision for adjustment of gathering chains and gather-point supports with respect to snapping rolls; and, Figure 3 is a side view of a snapping unit showing an adjustable gather point.
Figure 3:
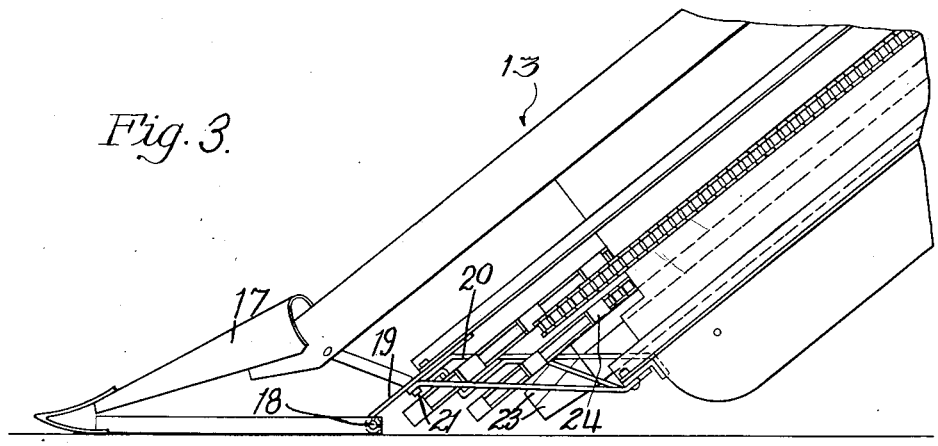

Figure 3 shows one divider point as pivoted at 18 on a plate 19 secured to a member 20 by means of a bolt 21. As seen in Figure 2, the bolt 21 may extend through any one of a number of holes 22 in the plate 19. The member 20 is fixed with respect to snapping rolls 23. Thus, by shifting plate 19, to which gathering point 17 is pivoted at 18, and by causing bolt 21 to extend through a different hole 22, there is adjustment of gathering point 17 with respect to the lower ends of the snapping rolls in the direction of the length thereof.

Figure 2 shows gather chains 24 in the form of loops, of which only one end is shown. There are idler sprockets 25 within the ends of the gathering chain loops 24. The sprockets 25 are adjustable lengthwise of the snapping rolls 23 by means illustrated only with the left-hand sprocket 25. This sprocket 25 is rotatably mounted on a part 26 carried at the end of a rod 27 having a threaded portion 28. Nuts 29, which may be screwed along the threaded portion 28 and abut a protruding part 30 fixed with respect to the snapping rolls, permit shifting of the rod and of the sprocket 25 with respect to the snapping rolls 23.

Adjacent the ends of the snapping rolls 23 and within but spaced from the lower ends of the loops 24 are rollers 31. Each roller is mounted in one of a set of holes 32 in plates 33 fixed against movement with respect to the snapping rolls. By shifting of the rollers from one hole to another there is an adjustment of the length of gather chains extending parallel to the snapping rolls 23.

By the arrangements described there is adjustment of the gathering point 17, the idlers 25 at the ends of gathering chain loops 24, and the rollers 31 with respect to the lower end of the snapping rolls 23. By adjustment of the gathering point 17 there is adjustment of the lower end of the rolls or the height above the ground at which the ends of the rolls operate. By adjustments of the rollers 31, there is a change in the length of the gathering chains immediately adjacent the snapping rolls 23. Consequently, the gathering chains can be made more effective or less effective near the ground and immediately adjacent the snapping rolls 23.

It will be apparent from the foregoing description that a new and novel arrangement has been provided for the adjustment of parts adjacent the lower ends of snapping rolls.

The intention is to limit the invention only within the scope of the appended claims.

What is claimed is:

1. In combination, supporting means, a pair of snapping rolls, a divider point, means mounting the divider point on the supporting means adjacent the lower end of the snapping rolls for bodily adjustment in the direction of the length of the snapping rolls, a gatherer chain mounted on the supporting means and having a portion extending generally parallel to and adjacent the snapping rolls and a further portion near one end of the snapping rolls extending away from the same, guiding means engaging the gathering chain between the said portions thereof, and means mounting the guiding means on the supporting means for adjustment longitudinally of the snapping rolls.

2. In combination, supporting means, a pair of snapping rolls, a divider point, means mounting the divider point on the supporting means adjacent the lower end of the snapping rolls for bodily adjustment in the direction of the length of the snapping rolls, a gatherer chain mounted on the supporting means and having a portion extending generally parallel to and adjacent the snapping rolls and a further portion near one end of the snapping rolls extending away from the same, a roller engaging the gathering chain between the said portions thereof, and means mounting the roller on the supporting means for adjustment longitudinally of the snapping rolls.

3. In combination, supporting means, a pair of snapping rolls, a divider point, means mounting the divider point on the supporting means adjacent the lower end of the snapping rolls for bodily adjustment in the direction of the length of the snapping rolls, a gatherer-chain loop mounted on the supporting means and having a portion extending generally parallel to the snapping rolls and another portion extending slightly away from the rolls to an end of the loop, a sprocket within the end of the loop, a roller engaging the inside of the loop between the said portions thereof, and means mounting the roller on the supporting means for adjustment longitudinal of the snapping rolls 4. In combination, supporting means, a pair of snapping rolls, a divider point, means pivotally mounting the divider point on the supporting means adjacent the lower end of the snapping rolls, means for adjusting the pivotal mounting of the divider point for bodily shifting of the divider point in the direction of the length of the snapping rolls, a gatherer chain mounted on the supporting means and having a portion extending generally parallel to and adjacent the snapping rolls and a further portion near one end of the snapping rolls extending away from the same, guiding means engaging the gathering chain between the said portions thereof, and means mounting the guiding means on the supporting means for adjustment longitudinally of the snapping rolls.

5. In combination, supporting means, a pair of snapping rolls, a divider point, means pivotally mounting the divider point on the supporting means adjacent the lower end of the snapping rolls, means for adjusting the pivotal mounting of the divider point for bodily shifting of the divider point in the direction of the length of the snapping rolls, a gatherer chain mounted on the supporting means and having a portion extending generally parallel to and adjacent the snapping rolls and a further portion near one end of the snapping rolls extending away from the same, a roller engaging the gathering chain between the said portions thereof, and means mounting the roller on the supporting means for adjustment longitudinal of the snapping rolls.

6. In combination, supporting means, a pair of snapping rolls, a divider point, means pivotally mounting the divider point on the supporting means adjacent the lower end of the snapping rolls, means for adjusting the pivotal mounting of the divider point for bodily shifting of the divider point in the direction of the length of the snapping rolls, a gatherer-chain loop mounted on the supporting means and having a portion extending generally parallel to the snapping rolls and another portion extending slightly away from the rolls to an end of the loop, a sprocket within the end of the loop, a roller engaging the inside of the loop between the said portions thereof, and means mounting the roller on the supporting means for adjustment longitudinal of the snapping rolls.

7. In combination, supporting means, a pair of snapping rolls, a divider point, means pivotally mounting the divider point on the supporting means, means for adjustably mounting the pivotally mounting means on the supporting means, said means comprising a hole in one means, a series of holes in the other means, and a bolt insertable through the hole in one means and any of the series of holes in the other means, a gatherer chain mounted on the supporting means and having a portion extending generally parallel to and adjacent the snapping rolls and a further portion near one end of the snapping rolls extending away from the same, guiding means engaging the gathering chain between the said portions thereof, and means mounting the guiding means on the supporting means for adjustment longitudinal of the snapping rolls.

8. In combination, supporting means, a pair of snapping rolls, a divider point, means pivotally mounting the divider point on the supporting means, means for adjustably mounting the pivotally mounting means on the supporting means, said means comprising a hole in one means, a series of holes in the other means, and a bolt insertable through the hole in one means and any of the series of holes in the other means, a gatherer chain mounted on the supporting means and having a portion extending generally parallel to and adjacent the snapping rolls and a further portion near one end of the snapping rolls extending away from the same, a roller engaging the gathering chain between the said portions thereof, and means mounting the roller on the supporting means for adjustment longitudinal of the snapping rolls.

9. In combination, supporting means, a pair of snapping rolls, a divider point, means pivotally mounting the divider point on the supporting means, means for adjustably mounting the pivotally mounting means on the supporting means, said means comprising a hole in one means, a series of holes in the other means, and a bolt insertable through the hole in one means and any of the series of holes in the other means, a gatherer-chain loop mounted on the supporting means and having a portion extending generally parallel to the snapping rolls and another portion extending slightly away from the rolls to an end of the loop, a sprocket within the end of the loop, a roller engaging the inside of the loop between the said portions thereof, and means mounting the roller on the supporting means for adjustment longitudinal of the snapping rolls.

10. In combination, a supporting means, a pair of snapping rolls, a divider point, means pivotally mounting the divider point on the supporting means adjacent the lower end of the snapping rolls, means for adjusting the pivotal mounting of the divider point for bodily shifting of the divider point in the direction of the length of the snapping rolls, a gatherer-chain loop mounted on the supporting means and having a portion extending generally parallel to the snapping rolls and another portion extending slightly away from the rolls to an end of the loop, a sprocket within the end of the loop, means mounting the sprocket on the supporting means for adjustment longitudinal of the snapping rolls, a roller engaging the inside of the loop between the said portions thereof, and means mounting the roller on the supporting means for adjustment longitudinally of the snapping rolls.

11. In combination, supporting means, a pair of snapping rolls mounted thereon, a gatherer-chain loop mounted on the supporting means and having a portion extending generally parallel to the snapping rolls and another portion extending slightly away from the rolls to an end of the loop, a sprocket within the end of the loop, means mounting the sprocket on the supporting means for adjustment longitudinal of the snapping rolls, a roller engaging the inside of the loop between the said portions thereof, and means mounting the roller on the supporting means for adjustment longitudinally of the snapping rolls.

BENJAMIN M. HYMAN.
RECTOR C. FERGASON.